US010151598B2

United States Patent
Jurk

(10) Patent No.: US 10,151,598 B2
(45) Date of Patent: Dec. 11, 2018

(54) METHOD AND DEVICE FOR OPERATING A VEHICLE AND DRIVER ASSISTANCE SYSTEM

(71) Applicant: Bayerische Motoren Werke Aktiengesellschaft, Munich (DE)

(72) Inventor: Reinhard Jurk, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/270,695

(22) Filed: Sep. 20, 2016

(65) Prior Publication Data

US 2017/0082454 A1    Mar. 23, 2017

(30) Foreign Application Priority Data

Sep. 21, 2015  (DE) .................... 10 2015 218 042

(51) Int. Cl.
*G01C 21/36* (2006.01)
*G01C 21/30* (2006.01)
(Continued)

(52) U.S. Cl.
CPC ......... *G01C 21/3667* (2013.01); *G01C 21/20* (2013.01); *G01C 21/30* (2013.01); *G01C 21/32* (2013.01); *G08G 1/207* (2013.01)

(58) Field of Classification Search
CPC .... G01C 21/3667; G01C 21/20; G01C 21/32; G01C 21/30; G08G 1/207
(Continued)

(56) References Cited

U.S. PATENT DOCUMENTS 6,064,926 A * 5/2000 Sarangapani ........ G05D 1/0289
701/26
7,974,781 B2 * 7/2011 Emoto ............... G01C 21/3638
340/995.17
(Continued)

FOREIGN PATENT DOCUMENTS

CN     104812645 B  * 12/2017  ............. G08G 1/166
EP     2900531 B1   *  1/2018  ............... G08G 1/66
(Continued)

OTHER PUBLICATIONS

Sequential FDIA for Autonomous Integrity Monitoring of Navigation Maps on Board Vehicles; Clément Zinoune; Philippe Bonnifait; Javier Ibañez-Guzmán; IEEE Transactions on Intelligent Transportation Systems; Year: 2016, vol. 17, Issue: 1 pp. 143-155.*
(Continued)

*Primary Examiner* — Cuong H Nguyen
(74) *Attorney, Agent, or Firm* — Crowell & Moring LLP

(57) ABSTRACT

As a function of a provided geoposition for the vehicle, a first position of the vehicle is determined in a first map, which represents a first geographic region. As a function of the determined first position of the vehicle in the first map, a map segment of a second map is determined. The second map has several map segments, which each represent predefined segments of a predefined second geographical region, and wherein directly adjoining segments overlap one another in a predefined manner. As a function of detection data of at least one predefined environment sensor of the vehicle and as a function of second map data of the determined map segment, a second position of the vehicle is determined in the map segment.

17 Claims, 4 Drawing Sheets

(51) Int. Cl.
*G01C 21/20* (2006.01)
*G01C 21/32* (2006.01)
*G08G 1/00* (2006.01)

(58) Field of Classification Search
USPC ............ 701/410, 24–25; 340/995.11, 995.14
See application file for complete search history.

(56) References Cited

U.S. PATENT DOCUMENTS

| | | | | |
|---|---|---|---|---|
| 8,700,251 | B1* | 4/2014 | Zhu | G05D 1/02 701/25 |
| 9,221,396 | B1* | 12/2015 | Zhu | B60Q 9/008 |
| 9,633,564 | B2* | 4/2017 | Ferguson | G08G 1/166 |
| 2008/0228395 | A1* | 9/2008 | Kobori | G01C 21/00 701/8 |
| 2014/0088855 | A1* | 3/2014 | Ferguson | G08G 1/166 701/117 |
| 2015/0051829 | A1* | 2/2015 | Gearhart | G01C 21/343 701/467 |

FOREIGN PATENT DOCUMENTS

| | | | | |
|---|---|---|---|---|
| KR | 2015060953 A | * | 3/2015 | ............ G08G 1/166 |
| WO | WO-2014099069 A2 | * | 6/2014 | ............ G08G 1/166 |
| WO | WO 2014/139821 A1 | | 9/2014 | |

OTHER PUBLICATIONS

Stereo vision based road scene segment and vehicle detection; Kai Zhu; Jiangxiang Li; Haofeng Zhang; Proceedings of 2nd International Conference on Information Technology and Electronic Commerce; Year: 2014; pp. 152-156.*
Aggressive navigation using high-speed natural feature point tracking; Chris Raabe; Daniel Henell; Emad Saad; John Vian 2014 IEEE Aerospace Conference; Year: 2014; pp. 1-13.*
Predicting Millimeter Wave Radar Spectra for Autonomous Navigation; Ebi Jose; Martin Adams; John Stephen Mullane; Nicholas M. Patrikalakis; IEEE Sensors Journal; Year: 2010, vol. 10, Issue: 5; pp. 960-971.*
Stereo vision based road scene segment and vehicle detection; Kai Zhu et al.; Proceedings of 2nd International Conference on Information Technology and Electronic Commerce; Year: 2014; pp. 152-156, IEEE Conferences.*
Creating Enhanced Maps for Lane-Level Vehicle Navigation; David Betaille; Rafael Toledo-Moreo IEEE Transactions on Intelligent Transportation Systems; Year: 2010, vol. 11, Issue: 4; pp. 786-789.*
A Novel Adjustment Model for Mosaicking Low-Overlap Sweeping Images; Jianchen Liu et al.; IEEE Transactions on Geoscience and Remote Sensing; Year: 2017, vol. 55, Issue: 7; pp. 4089-4097.*
Real-time automatic vehicle management system using vehicle tracking and car plate number identification; Hwajeong Lee; Daehwan Kim et al.; Multimedia and Expo, 2003. ICME 2003. Proceedings. Year: 2003, vol. 2; pp. II-353-6 vol. 2.*
GPS-RDS enabled location based smart transit; Anjul Agarwal ; Neena Goel; 2009 13th International Conference on Intelligence in Next Generation Networks; pp. 1-5; Year 2009.*
A resolution-driven generalization approach for linear and areal objects; Pingtao Wang et al.; IGARSS 2003. 2003 IEEE International Geoscience and Remote Sensing Symposium. Proceedings (IEEE Cat. No. 03CH37477); pp. 2329-2331 vol. 4, year 2003, vol. 4.*
German Search Report issued in counterpart German Application No. 10 2015 218 042.5 dated Jun. 28, 2016, with partial English translation (fifteen (15) pages).
Liming Liu et al., "A Smart Map Representation for Autonomous Vehicle Navigation", Fuzzy Systems and Knowledge Discovery (FSKD), 2015, pp. 2308-2313.

* cited by examiner

METHOD AND DEVICE FOR OPERATING A VEHICLE AND DRIVER ASSISTANCE SYSTEM

CROSS REFERENCE TO RELATED APPLICATIONS

This application claims priority under 35 U.S.C. § 119 from German Patent Application No. 10 2015 218 042.5, filed Sep. 21, 2015, the entire disclosure of which is herein expressly incorporated by reference.

BACKGROUND AND SUMMARY OF THE INVENTION

The invention relates to a method and a corresponding device for operating a vehicle as well as a driver assistance system. The invention further relates to a computer program and a computer program product.

For locating vehicles within their environment for the purpose of navigation between two locations, currently data of global navigation satellite systems (GNSS) and digital road maps are frequently used. The digital road maps use data models based on graph networks with geometric information, which is assigned to edges of a respective graph. In the following, this class of data models is called link-node geometry (LNG).

For a highly automated driving of a vehicle, in contrast, detailed and highly accurate map data are a prerequisite. These maps are based on a different data model which uses a precise geometry of a route as the basis, because, in this use case, the focus is on a determination of a local trajectory of the vehicle and/or a highly accurate locating of the vehicle. In the following, these maps are also called highly accurate geometric maps HGK.

Currently, suitable trajectory planning for an autonomously driving vehicle can only be carried out on the basis of a highly accurate geometric map. However, such a highly accurate geometric map is not suitable for the use of conventional navigation between two locations. LNG maps are significantly better suited for that purpose.

The map material for highly automated driving currently comprises several layers. By way of a navigation layer, a computation of the travel route takes place from a starting location to a destination location, with the succession of the roads to be traveled. By means of a locating layer, an automated vehicle determines, for example, its accurate position in a driving lane. For this purpose, it compares, for example, information about objects which it detects by use of environment sensors of the vehicle with corresponding object data of the locating layer. The vehicle can thereby detect its relative position with respect to the concerned objects. A planning layer situated above, in particular, contains information concerning the road geometry, such as curve radii and gradients.

It is an object to the invention to create a method and a corresponding device for operating a vehicle which drives autonomously or in an automated manner, permitting a flexible utilization of map data.

This and other objects are achieved according to a first and second aspect of the invention by a method and a corresponding device for operating a vehicle. In this case, as a function of a provided geoposition for the vehicle, a first position of the vehicle is determined in a first map, which represents a first geographic region. As a function of the determined first position of the vehicle in the first map, a map segment of a second map is determined. The second map comprises several map segments, which each represent predefined segments of a predefined second geographical region, and wherein directly adjoining segments overlap one another in a predefined manner. As a function of detection data of at least one predefined environment sensor of the vehicle and as a function of second map data of the determined map segment, a second position of the vehicle is determined in the map segment.

This has the advantage that a relative positioning accuracy of the first map and the second map with respect to one another no longer has to be extremely precise. A certain geometrical offsetting of the two maps can be allowed. It thereby becomes possible to modularize both maps with respect to one another and thereby also utilize different data collection methods when generating maps. It therefore also becomes possible to use maps of different producers. More possibilities are therefore available for selecting the maps in an application-specific manner and more in line with the demands.

The at least one environment sensor may be a camera, a radar, a LIDAR (light detection and ranging) and/or an ultrasonic sensor.

In an advantageous further development according to the first and second aspect, a driving of the vehicle into an overlapping area of two directly adjacent segments is detected, and when it was recognized that the vehicle has driven into the overlapping area, the first position of the vehicle in the first map will be determined as a function of a currently provided geoposition for the vehicle. As a function of the determined first position of the vehicle in the first map, a further map segment of the second map will be determined. As a function of the detection data of the at least one predefined environment sensor of the vehicle and as a function of the second map data of the determined further map segment, the second position of the vehicle is determined in the further map segment.

As a result of the fact that, when the overlapping area is reached, the further map segment is determined as a function of the current first position, and the second position of the vehicle in the further map segment is determined as a function of the second map data of the further map segment, the positioning precision between the first and the second map may be less.

In a further advantageous development according to the first and second aspect, a travel route for the vehicle from a starting location to a destination location is determined as a function of first map data of the first map, and the respective map segment is determined as a function of the determined travel route. The further map segment can be easily determined because a travel route course situated ahead will be known.

In a further advantageous development according to the first and second aspect, a desired trajectory for the vehicle is determined as a function of the determined second position of the vehicle and as a function of the second map data. This advantageously permits an autonomous or automated driving of the vehicle.

In a further advantageous development according to the first and second aspect, the first map has a graph network with nodes and edges, geographical coordinates being assigned to the respective nodes. The first map is based on a graph network model. This permits an efficient computation of optimal travel routes. In addition, a storage requirement for such a map can be kept relatively low.

In a further advantageous development according to the first and second aspect, the second map contains geometric data for characterizing geometric courses and/or dimensions of roads and/or objects. The second map is based on a geometry data model. This has the advantage that a course of a road can be determined very precisely.

In a further advantageous development according to the first and second aspect, the second map comprises object data for the characterization of objects. The object data can advantageously be used to determine a relative position of the vehicle with respect to the object by comparing the object data with information about objects that is determined by use of the predefined environment sensors of the vehicle. The second map data may therefore comprise geometry data and/or object data.

In a further advantageous development according to the first and second aspect, the first and the second map are generated by way of different data collection methods, and/or a data collection for the first map and the second map takes place during different time periods. Advantageously, the first map and the second map can therefore be generated in a flexible manner and, in particular, independently of one another, whereby a cost-effective generating of the maps becomes possible.

The invention is characterized according to a third aspect by a driver assistance system that has as positioning module, a trajectory module and a control module. The positioning module is designed for implementing the method according to the first aspect or for implementing an advantageous further development of the method according to the first aspect. The trajectory module is designed for determining a desired trajectory for the vehicle as a function of the determined second position of the vehicle and as a function of the second map data. The control module is designed for determining control signals for predefined actuators of the vehicle, as a function of the determined desired trajectory.

A control device of the vehicle may include the positioning module, the trajectory module and the control module. The positioning module, the trajectory module and the control module may be constructed as software modules. As an alternative, the modules may each be constructed as independent hardware components and/or software components.

According to a further aspect, the invention is characterized by a computer program, the computer program being designed for implementing the method according to the first aspect and/or an advantageous further development of the method according to the first aspect on a data processing device.

According to a further aspect, the invention is characterized by a computer program product, which comprises implementable program code, wherein, in the case of an implementation by a data processing device, the program code implements the method according to the first aspect and/or an advantageous development of the method according to the first aspect.

The computer program product comprises particularly a medium that is readable by the data processing device, on which medium the program code is stored.

Other objects, advantages and novel features of the present invention will become apparent from the following detailed description of one or more preferred embodiments when considered in conjunction with the accompanying drawings.

BRIEF DESCRIPTION OF THE DRAWINGS

Elements of identical construction or function have the same reference numbers in all figures.

DETAILED DESCRIPTION OF THE DRAWINGS

Figure 1:
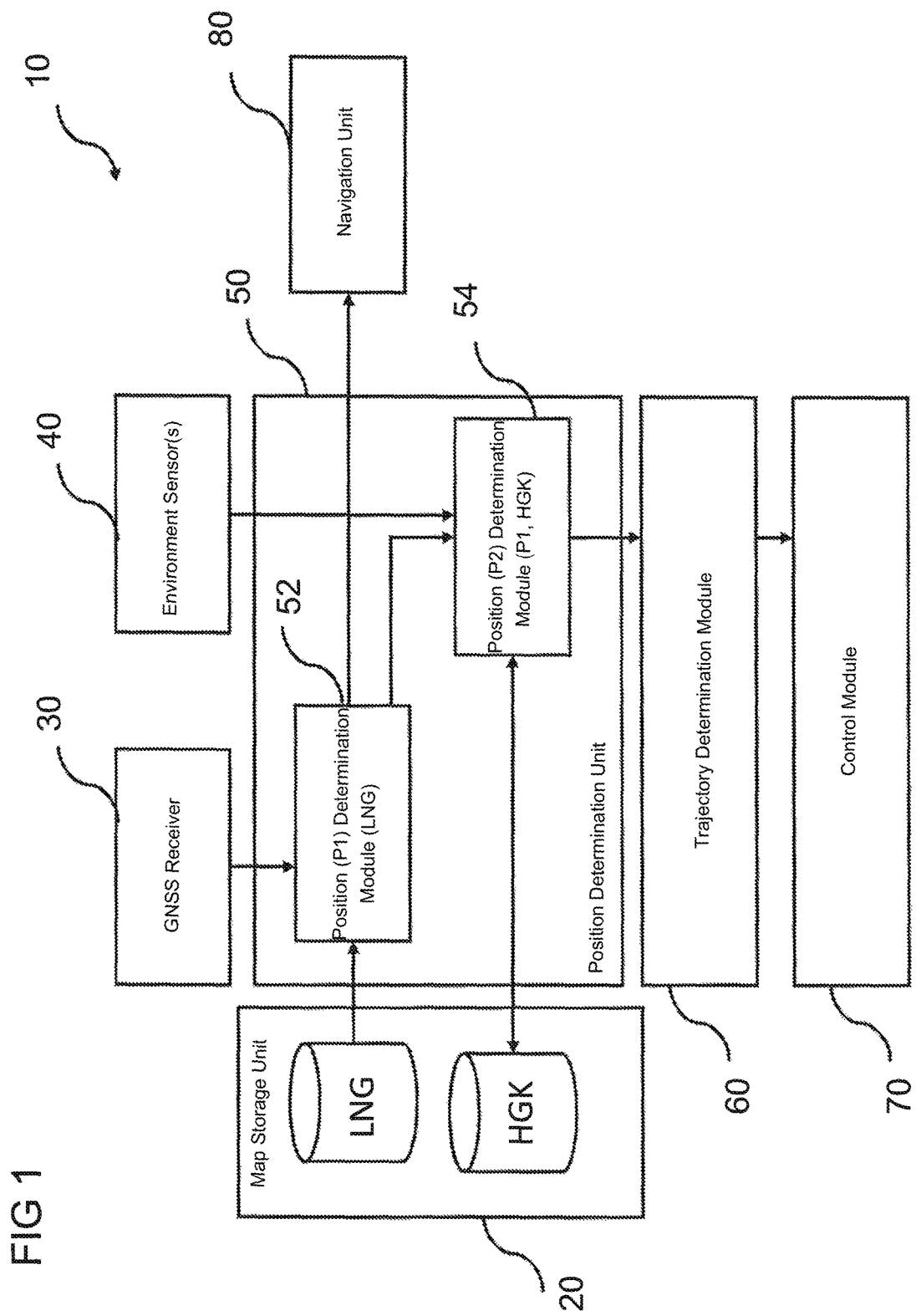
FIG. 1 is a block diagram of a system for a vehicle that drives autonomously or in an automated manner.

FIG. 1 illustrates a system 10 for a vehicle, particularly a motor vehicle, which is designed for driving autonomously or in an automated manner.

The system 10 includes at least one map storage unit 20, a position determination unit 50, for example, a GNSS receiver 30 (GNSS=Global Navigation Satellite System), and one or more environment sensors 40.

The at least one map storage unit 20 is, for example, designed for making available first map data of a first LNG map. Here, the first LNG map represents a predefined first geographic region. The first LNG map is based, for example, on a graph network with nodes and edges, geographic coordinates being assigned to the nodes. Preferably, at least one geometric piece of information, such as a length, is assigned to the respective edges. The first LNG map is therefore based on a link node geometry data model. The first LNG map has, for example, a geometric resolution in the meter range and is suitable for navigation purposes.

The at least one map storage unit 20 is, for example, further designed for providing second map data of a second highly accurate geometric map HGK. Here the second highly accurate geometric map HGK represents a predefined second geographic region, in which case the first geographic region of the first LNG map may be identical to the second geographic region of the second highly accurate geometric map HGK. As an alternative, the first geographic region and the second geographic region may have at least one identical segment. The first geographic region may, for example, comprise Bavaria, and the second geographic area may, for example, comprise Munich. Preferably, the first geographic region and the second geographic regions comprise smaller regions, for example, the next x kilometers of a specified expressway.

The second highly accurate geometric map HGK is based, for example, on geometric data which characterize a geometric course and/or dimensions of a road and/or of an object, for example, a height variation and/or a course of a curve of a road. The second highly accurate geometric map HGK may, for example, also comprise object data, which make it possible, for example, by a comparison of the object data with information concerning objects, which are determined by way of predefined vehicle environment sensors, to determine a relative position of the vehicle with respect to the object. The second highly accurate geometric map HGK has a geometric resolution at least in the decimeter range.

Here, the second highly accurate geometric map includes several map segments (BOX), which each represent segments M of the second geographic region, directly adjacent segments M overlapping one another. The map storage unit 20 is preferably designed for providing the map segments BOX of the second highly accurate geometric map HGK independently of one another.

As an alternative or in addition, the second map HGK can be provided by a further map storage unit.

The at least one map storage unit 20 may include a central server device or an information pool, so that individual vehicles can access the first and second map LNG, HGK and/or so that in each case one segment of the first map LNG and/or of the second map HGK can be transmitted to the vehicles.

As an alternative, the map storage unit 20 may be arranged in the vehicle.

Figure 2:
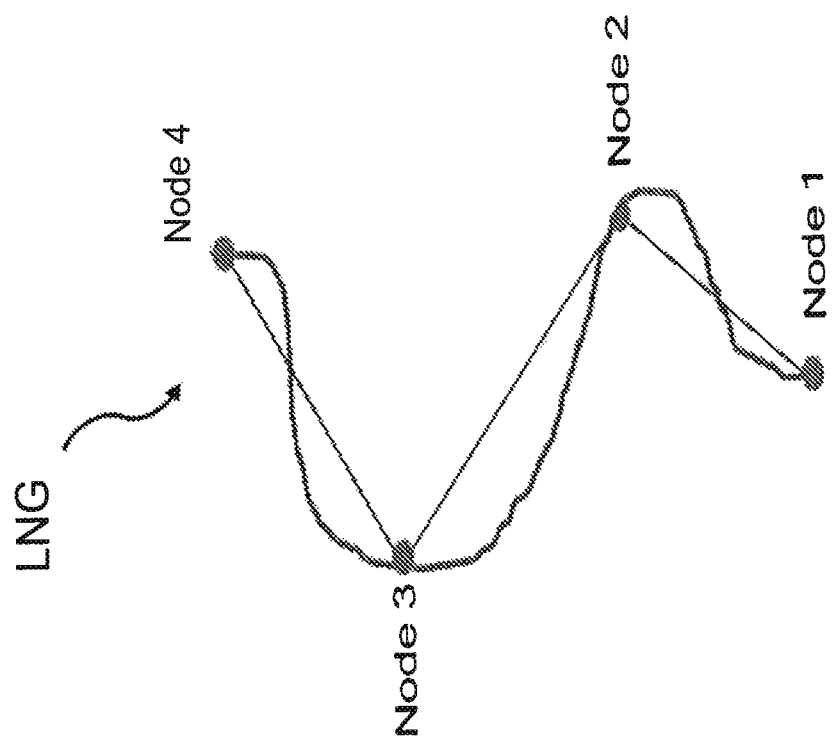
FIG. 2 is a view of a cutout from a first map.

FIG. 2 shows a cutout from the first map (LNG). The cutout illustrates, for example, a planned travel route of the vehicle and its image on a graph of the first map (LNG). In the example of FIG. 2, the graph of the travel route comprises four nodes: node 1, node 2, node 3 and node 4, which are connected with the shown edges.

Figure 3:
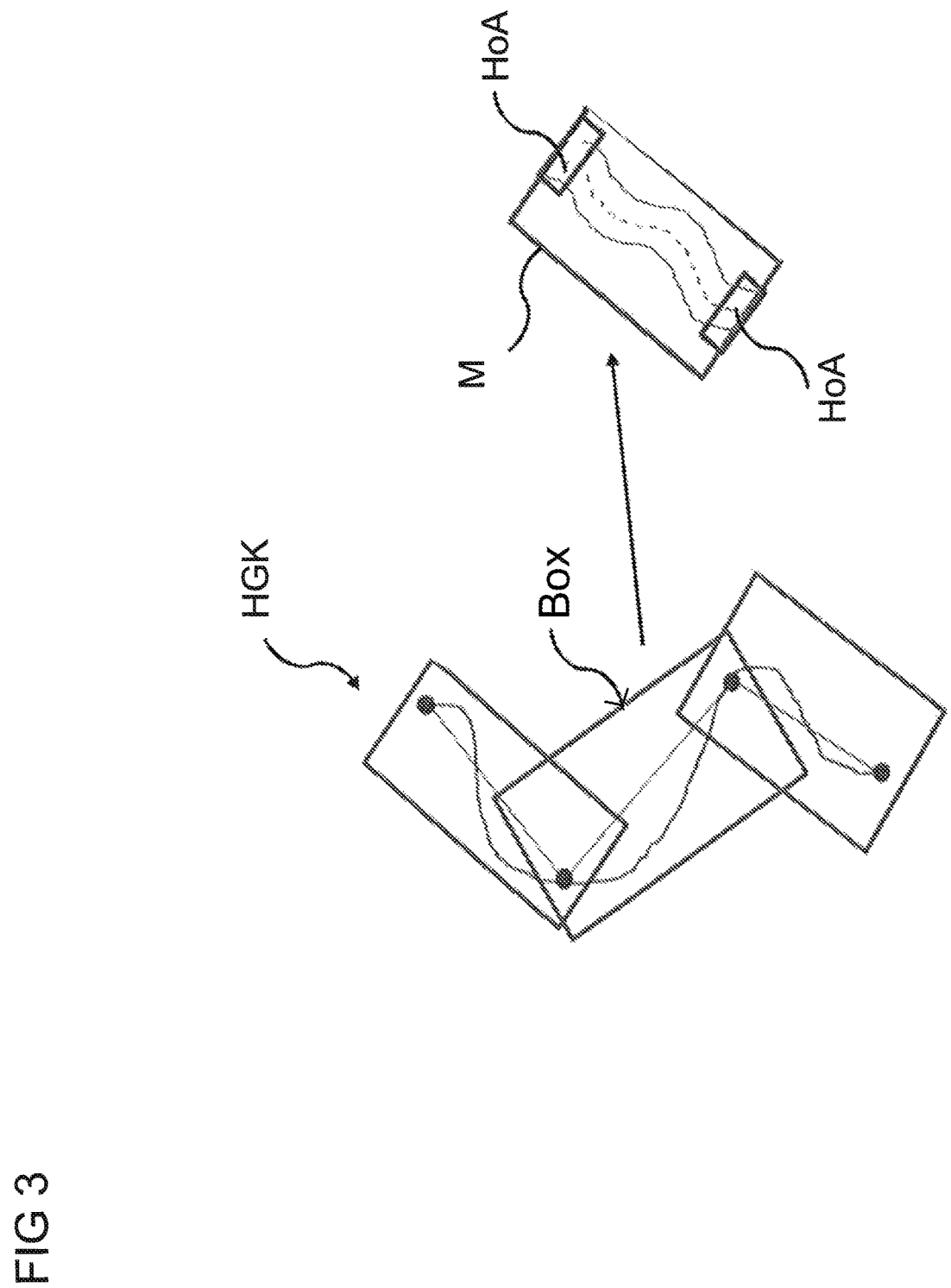
FIG. 3 is a view of cutouts from a second map.

FIG. 3 shows a cutout from the second map HGK. The cutout shows three segments M. The segments M each include the driving route sections between the respective nodes of the travel route of the first map LNG with their overlapping areas.

FIG. 3 further shows a detail of one of the three segments M and its overlapping areas (HoA). Each segment M preferably has two overlapping areas—one at one end of the driving route section and one at the other end of the driving route section.

The GNSS receiver 30 (FIG. 1) is arranged in the vehicle and is designed, for example, for determining a geoposition of the vehicle and making it available to the position determination unit 50.

The position determination unit 50 is preferably arranged in the vehicle for ensuring a fast providing of precise position data.

The position determination unit 50 may also be called a device for operating the vehicle.

The position determination unit 50 has, for example, an arithmetic unit and a storage unit and is designed for implementing a program for operating the vehicle.

The program is used, in particular, for the position determination of the vehicle for different applications in the vehicle.

Figure 4:
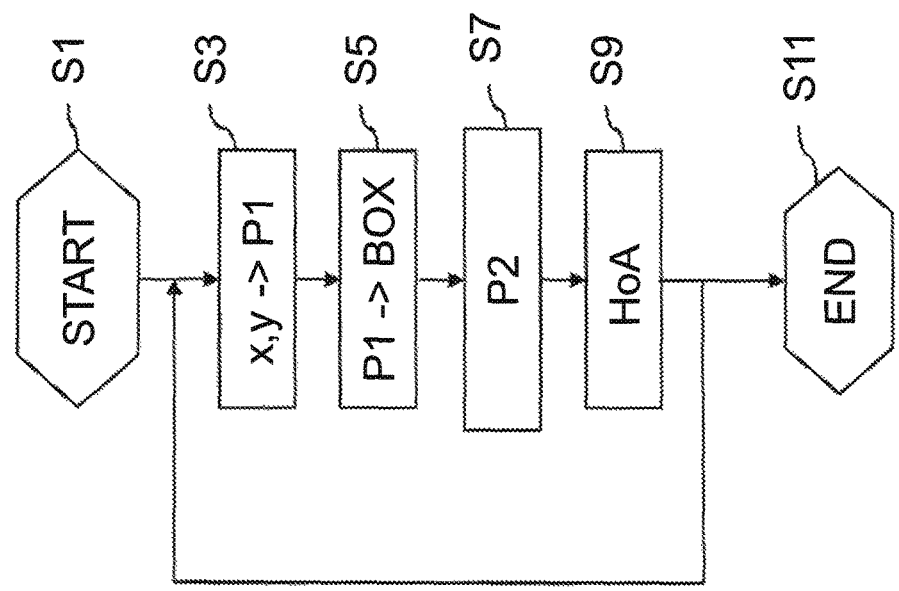
FIG. 4 is an exemplary flow chart for a program for operating a vehicle.

FIG. 4 illustrates an example of a flow chart of the program.

The program is started in a step S1, in which, if necessary, variables can be initialized. The program is started, for example, when a vehicle user specifies a desired destination location, for example, by use of an input device of a navigation unit 80, for the vehicle.

In a step S3, as a function of a current geoposition x, y of the vehicle, which is provided, for example, by the GNSS receiver, a first position P1 of the vehicle in the first map LNG is determined. Here, first map data of the first map LNG are provided by the map storage unit 20. As an alternative or in addition, the current geoposition of the vehicle can be determined and provided by way of a mobile radio system.

In a step S5, as a function of the determined first position P1 of the vehicle in the first map LNG, one of the map segments BOX of the second map HGK is determined, in particular it is selected.

The map segments BOX are stored, for example, while being assigned to position information relative to segment M of the map segment BOX.

A characterization of the respective map segment BOX takes, for example, by way of its edge coordinates ("Bounding Box"). For example, when the determined first position PI is comprised by the edge coordinates of a corresponding map segment BOX, this map segment BOX will be selected.

In a step S7, as a function of detection data of the at least one environment sensor 40 of the vehicle and as a function of second map data of the determined map segment BOX, a second position P2 of the vehicle in the determined map segment BOX will be determined.

In a step S9, a driving of the vehicle into an overlapping area HoA of a currently traveled segment is detected. When it is then recognized that the vehicle has driven into the overlapping area HoA, the running-through of the program will take place again starting in Step S3.

The program can be terminated in step S11. The program may, for example, be terminated when the vehicle parks. As an alternative or in addition, the program can, for example, be terminated when the driver assistance operation is ended by switching off or by a taking-over by the driver.

The determination or selection of the respective map segment BOX of the second map HGK can, for example, take place as a function of a determined travel route. The determined travel route makes it possible to very easily determine the travel direction of the vehicle. It can thereby very easily be determined through which segment M the driving will take place next.

The program may comprise a first module 52 and a second module 54.

Step S3 is, for example, carried out by the first module 52. Step S3 is, for example, carried out by the first module 52 in a continuously repeated manner, and the respectively determined first position P1 is continuously provided for the navigation unit 80.

Steps S5 to S9 are carried out, for example, by the second module 54.

The system 10 includes, for example, a trajectory module 60, which is designed for determining a desired trajectory for the vehicle as a function of the determined second position P2 of the vehicle and as a function of the second map data. The system 10 further includes a control module 70 that is designed for determining control signals for predefined actuators of the vehicle as a function of the determined desired trajectory.

This makes it possible that, by means of the first map LNG and the second map HGK, a travel route can be determined or trajectory planning for an autonomous driving of a vehicle can take place, although the relative positioning accuracy the first map LNG and the second map HGK lacks some clarity.

LIST OF REFERENCE SYMBOLS

10 System
20 Map storage unit
30 GNSS receiver
40 Environment sensor
50 Position determination unit
52 First module
54 Second module
60 Trajectory module
70 Control module
80 Navigation unit
BOX Map segment
HGK Second map
HoA Overlapping area
LNG First map
M Segment
P1 First position
P2 Second position
S1, . . . , S11 Program steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an autonomous vehicle, the method comprising the acts of:
   as a function of a provided geoposition for the autonomous vehicle, determining a first position of the autonomous vehicle in a first map, which represents a first geographic region;
   as a function of the determined first position of the autonomous vehicle in the first map, determining a map segment of a second map, the second map comprising several map segments, each of which represent predefined segments of a predefined second geographical region, wherein directly adjoining segments overlap one another; and
   as a function of detection data of at least one predefined environment sensor of the autonomous vehicle and as a function of second map data of the determined map segment, determining a second position of the autonomous vehicle in the determined map segment.

2. The method according to claim 1, wherein:
   a driving of the autonomous vehicle into one of the overlapping areas of a currently traveled segment is detected, and when recognized that the autonomous vehicle has driven into the overlapping area, the method further comprises the acts of:
   determining the first position of the autonomous vehicle in the first map as a function of a currently provided geoposition for the autonomous vehicle;
   as a function of the determined first position of the autonomous vehicle in the first map, determining a further map segment of the second map; and
   as a function of the detection data of the at least one predefined environment sensor of the autonomous vehicle and as a function of the second map data of the determined further map segment, determining the second position of the autonomous vehicle in the determined further map segment.

3. The method according to claim 1, wherein a travel route for the autonomous vehicle from a starting location to a destination location is determined as a function of first map data of the first map, and the respective map segment is determined as a function of the determined travel route.

4. The method according to claim 1, wherein the first map has a graph network with nodes and edges, geographical coordinates being assigned to the respective nodes.

5. The method according to claim 1, wherein the second map contains at least one of geometric data for characterizing geometric courses and dimensions of roads and objects.

6. The method according to claim 1, wherein the second map comprises object data for characterizing objects.

7. The method according to claim 1, wherein the first map and the second map are generated by different data collection methods, or a data collection for the first map and the second map takes place during different time periods.

8. The method according to claim 1, wherein a desired trajectory for the autonomous vehicle is determined as a function of the determined second position of the autonomous vehicle and as a function of the second map data.

9. A driver assistance system for an autonomous vehicle, comprising:
   a positioning module comprising a controller that includes a processor and executes instructions to:
   as a function of a provided geoposition for the autonomous vehicle, determine a first position of the autonomous vehicle in a first map, which represents a first geographic region;
   as a function of the determined first position of the autonomous vehicle in the first map, determine a map segment of a second map, the second map comprising several map segments, each of which represent predefined segments of a predefined second geographical region, wherein directly adjoining segments overlap one another; and
   as a function of detection data of at least one predefined environment sensor of the autonomous vehicle and as a function of second map data of the determined map segment, determine a second position of the autonomous vehicle in the determined map segment;
   a trajectory module configured to determine a desired trajectory for the autonomous vehicle as a function of the determined second position of the autonomous vehicle and as a function of the second map data; and
   a control module configured to determine control signals for predefined actuators of the autonomous vehicle as a function of the determined desired trajectory.

10. A computer product comprising a non-transitory computer readable medium having stored thereon program code that, when executed, cause a processor to:
    as a function of a provided geoposition for an autonomous vehicle, determine a first position of the autonomous vehicle in a first map, which represents a first geographic region;
    as a function of the determined first position of the autonomous vehicle in the first map, determine a map segment of a second map, the second map comprising several map segments, each of which represent predefined segments of a predefined second geographical region, wherein directly adjoining segments overlap one another; and
    as a function of detection data of at least one predefined environment sensor of the autonomous vehicle and as a function of second map data of the determined map segment, determine a second position of the autonomous vehicle in the determined map segment.

11. The computer product according to claim 10, further comprising program code that causes the processor to:
    detect a driving of the autonomous vehicle to one of the overlapping areas of a currently travelled segment, and when recognizing that the autonomous vehicle has driven into the overlapping area:
    determine the first position of the autonomous vehicle in the first map as a function of a currently provided geoposition for the autonomous vehicle;
    as a function of the determined first position of the autonomous vehicle in the first map, determine a further map segment of the second map; and
    as a function of the detection data of the at least one predefined environment sensor of the autonomous vehicle and as a function of the second map data of the determined further map segment, determine the second position of the autonomous vehicle in the further map segment.

12. The computer product according to claim 10, wherein a travel route for the autonomous vehicle from a starting location to a destination location is determined as a function of first map data of the first map, and the respective map segment is determined as a function of the determined travel route.

13. The computer product according to claim 10, wherein the first map has a graph network with nodes and edges, geographical coordinates being assigned to the respective nodes.

14. The computer product according to claim 10, wherein the second map contains at least one of geometric data for characterizing geometric courses and dimensions of roads and objects.

15. The computer product according to claim 10, wherein the second map comprises object data for characterizing objects.

16. The computer product according to claim 10, wherein the first map and the second map are generated by different data collection methods, or a data collection for the first map and the second map takes place during different time periods.

17. The computer product according to claim 10, wherein a desired trajectory for the autonomous vehicle is determined as a function of the determined second position of the autonomous vehicle and as a function of the second map data.

* * * * *